Patented Apr. 8, 1952

2,591,890

UNITED STATES PATENT OFFICE 2,591,890

PRODUCTION OF HIGH MOLECULAR WEIGHT RESINOUS AND PLASTIC MATERIALS HAVING AN AROMATIC STRUCTURE

Ralph B. Thompson, Hinsdale, and Louis Schmerling, Riverside, Ill., assignors to Universal Oil Products Company, Chicago, Ill., a corporation of Delaware No Drawing. Application November 24, 1948, Serial No. 61,926

13 Claims. (Cl. 260—2)

This invention relates to a process for the preparation of resinous substances characterized as the condensation product of an alkyl aromatic hydrocarbon containing at least two alkyl groups each of which has at least one hydrogen atom attached to the alpha-carbon atom, the condensation reaction being effected in the presence of a substance capable of producing free radicals under the conditions of reaction.

It is an object of the present invention to provide a process for the condensation of a alkyl aromatic hydrocarbon utilizing as condensing agent a substance capable of producing free radicals to form thereby a resinous or plastic material useful as a film-forming component of a coating composition, as a molding resin, or as a plastic useful, for example, in the production of heat molded forms and in the preparation of water-repellent fabrics.

It is another object of the present invention to provide a process for the condensation of an alkyl aromatic hydrocarbon utilizing an oxygen-containing compound as condensing agent.

Another object of the invention is to provide a resinous material which is soluble in organic solvents, particularly hydrocarbons, such as hydrocarbon drying oils.

One embodiment of the invention relates to a process for the preparation of a resinous substance which comprises reacting an alkyl aromatic hydrocarbon with at least a stoichiometric proportion or at least one molecular proportion of an organic compound containing peroxidic oxygen at condensation reaction conditions sufficient to form said resinous substance as a product of the reaction.

A more specific embodiment of the invention concerns a process for the preparation of a resin which comprises reacting equimolecular proportions of a polyalkylbenzene, at least two alkyl groups of which are selected from the class consisting of primary and secondary alkyl groups, with an organic peroxide to form a resinous condensation product.

Other objects and embodiments of the present invention relating to specific reactants, reagents, and methods of effecting the present condensation reaction will be referred to in greater detail in the following further description of the process.

The reactant herein provided which undergoes condensation by reaction with the substance capable of producing free radicals is a poly-alkyl aromatic hydrocarbon, at least two alkyl groups of which are selected from the class consisting of primary and secondary alkyl groups. The aromatic hydrocarbon reactants of the present process are preferably benzenoid; that is, the aromatic hydrocarbon molecule contains a benzene nucleus, although it is also within the contemplation of the present process that polynuclear aromatic hydrocarbons, such as those containing phenanthrene, anthracene, naphthalene, etc. nuclei may be utilized in the condensation reaction. The alkyl aromatic hydrocarbons utilizable in the present process preferably contain 2 up to about 4 alkyl groups which preferably have at least 2 carbon atoms per group and said groups are preferably secondary alkyl groups. Typical representative alkyl aromatic compounds having the above general characterization include the di-propylbenzenes, particularly 1,4 - di - isopropylbenzene, the di-butylbenzenes, 1,4-di-isobutyl-2-ethylbenzene, 1,4-di-sec-butylbenzene, p-xylene, 1,3,5-tri-ethylbenzene, etc. Alkyl substituted aromatic compounds which contain other substituents in addition to alkyl groups may be utilized as reactants herein; such substances as the alkyl substituted aromatic compounds containing halo, nitro, and carboxyl groups are particularly desirable alternative reactants in the present process.

In general the dialkyl aromatic hydrocarbons will yield thermoplastic resins while tri and more highly alkylated aromatic hydrocarbons will yield cross-linked resins which are thermosetting. The softening points of the resins may be varied by using mixtures of dialkyl aromatics with minor proportions of more highly alkylated aromatics, whereby variation of the amount of cross-linking may be achieved.

The substance capable of producing free radicals which effects poly-condensation of the poly-alkyl substituted aromatic hydrocarbon reactant and forms the present high molecular weight hydrocarbonaceous resins is preferably an oxygen-containing reagent such as an organic peroxide or molecular oxygen. Typical organic peroxides utilizable in the reaction include such organic compounds as the alkyl, naphthyl, and aryl peroxides represented by the formula: R—O—O—R'; the acyl peroxides represented by the structural formula:

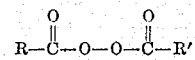

where R and R' may be alkyl, naphthenyl, aryl, aralkyl radicals; the ester peroxides represented by the structural formula:

and the hydroperoxides represented by the formula: R—O—OH, in which R represents a radical similar to the designated substituents represented by R in the above formula. Typical oxygen-containing compounds in the group of simple peroxides are such compounds as dimethyl, diethyl, di-isopropyl, and di-tertiary-butyl peroxides formed, for example, by reacting an aqueous alkaline solution of hydrogen peroxide with the corresponding dialkyl sulfate or by the controlled oxidation of a hydrocarbon with oxygen in the presence of a hydrogen halide, as in the production of di-tertiary-butyl peroxide by the oxidation of isobutane with oxygen in the presence of hydrogen bromide. The alkyl hydroperoxides represent another class of organic peroxidic compounds utilizable in this process, a typical representative compound of which includes isopropyl hydroperoxide:

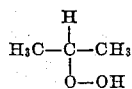

prepared, for example, by the oxidation of propylene in the presence of sulfuric acid with hydrogen peroxide or the oxidation of isobutane with oxygen in the presence of hydrogen bromide.

Other substances which are capable of producing free radicals and which may be utilized in the process of this invention include metal alkyls, for example, tetraethyl lead, and certain nitrogen-containing compounds, examples of which are diazomethane, triphenylmethylazobenzene, and trimethylamine oxide.

It is considered to be within the scope of the process of this invention to form a peroxidic compound or other oxygen-containing derivative of the poly-alkyl aromatic hydrocarbon reactant in situ, for example, by reacting said poly-alkyl aromatic hydrocarbon prior to effecting the condensation thereof with an oxygen-containing gas such as air until the proper proportion of oxygen-containing compound or peroxide is present in the reaction mixture. Following the initial oxidation, the reaction mixture containing the oxygen-containing compound and the excess poly-alkyl aromatic hydrocarbon reactant is heated to a temperature sufficient to effect said condensation reaction. This type of reaction may be effected batchwise or on a continuous basis by passing the poly-alkyl aromatic hydrocarbon into a primary reaction zone wherein said hydrocarbon is continuously contacted with the oxygen-containing gas at a particular temperature and pressure desirable for the formation of the peroxidic compound and thereafter continuously passing the reaction product into a second zone maintained at a somewhat higher temperature and lower pressure to effect the condensation reaction. In the latter arrangement, the oxidation is preferably allowed to proceed only to the stage at which an equimolecular mixture of the alkyl aromatic hydrocarbon and the oxidized alkyl aromatic hydrocarbon are formed in the reaction mixture. The oxidized product, if of suitable structure, may also be condensed with the poly-alkyl aromatic hydrocarbon during the condensation reaction and thus form part of the resinous material. Alternatively, the reaction mixture subjected to the primary oxidation reaction to form a peroxidic organic compound in situ may contain other components than the poly-alkyl aromatic hydrocarbon reactant which oxidize to form the peroxidic compound. For example, the mixture may comprise the poly-alkyl aromatic hydrocarbon and a saturated hydrocarbon, such as methylcyclohexane, which when subjected to oxidation in the primary reaction forms a mixture of hydroperoxide and said poly-alkyl aromatic hydrocarbon. The resulting mixture may be subsequently increased in temperature and the ambient pressure above the reactants increased to effect the desired condensation reaction. In most instances the oxidation is effected at temperatures of from about 30° to about 100° C. and at pressures of from about 2 to about 20 atmospheres to form the oxygen-containing reactant, such as a peroxide, in situ. The principal advantage of the latter alternative type of process in which the peroxide is formed in situ is a reduction in the cost of the ultimate resinous product and the fact that the primary reaction mixture may be subsequently converted to the resin or resin intermediate by merely increasing the temperature and/or pressure of the reaction mixture without the necessity of transferring the reactants to a separate apparatus to effect the condensation reaction. Furthermore in many cases it is possible to effect the condensation in one step by properly adjusting the temperature at which oxygen or air is passed into the hydrocarbon.

The condensation reaction provided in this process is effected at temperatures of approximately the decomposition point of the substance capable of producing free radicals, up to temperatures of about 100° C. in excess of said decomposition point. Tertiary butyl perbenzoate, for example, begins to decompose at about 115° C.; di-t-butyl peroxide, at 130–140° C., the reaction temperature corresponding to the use of the latter compounds being from about 200° to about 250° C. The ambient pressure, in general, depends upon the reaction temperature and is maintained at a value sufficient to provide essentially liquid phase conditions in the reaction mixture, generally up to about 100 atmospheres. Since the oxygen-containing organic compound or other substance capable of producing free radicals, utilized as one of the reactants in the process takes an active role in the reaction, rather than merely acting as a catalytic agent, the quantity of oxygen-containing reagent necessarily required is a stoichiometric, rather than a catalytic proportion. The organic residue of the oxygen-containing reagent may be allowed to remain in the reaction product to form a component of the resin or plastic formed in the present process, or the reaction product may be heated to a temperature sufficient to vaporize and thereby remove the organic residue of the oxygen-containing reactant as well as any unreacted poly-alkyl aromatic hydrocarbon and, if present, any relatively low molecular weight condensation product.

One of the preferred alternative methods of effecting the present condensation reaction is in the presence of an inert solvent, that is, a solvent substantially unaffected by the oxygen-containing reagent. Several solvents of this type are the paraffin and naphthenic hydrocarbons having a molecular weight sufficient to be readily maintained in liquid phase at the reaction pressure and temperature, such as normal hexane, cyclohexane, octane, etc. but which, on the other hand, are of sufficiently low molecular weight to be readily vaporized from the resinous condensation product following the reaction.

After substantial completion of the condensation reaction, usually after a reaction period of from about ½ to about ten hours in duration, the product is heated to a temperature sufficient to distill therefrom the excess reactants, diluent or the undesirable components formed during the reaction and deposit a residue comprising the high molecular weight resin or plastic product. The residue remaining after removal by vaporization of the solvent (if utilized) and excess reactant is generally a transparent material having a softening point above the boiling point of water, depending upon the type and molecular weight of the reactants utilized, and is generally soluble in organic solvents, especially hydrocarbons, which form a viscous solution therewith at relatively high concentrations of the resin in the solvent. One of the particular applications of the present resinous product is in the formulation of coating compositions in which a hydrocarbon type drying oil is utilized as one of the components thereof. Typical hydrocarbon type drying oils include, for example, the terpene hydrocarbons and the polyolefinic, cyclic hydrocarbon product of a conjunct polymerization reaction recovered from a sludge formed by contacting a hydrocarbon capable of undergoing said conjunct polymerization reaction with an acid-type catalyst such as aluminum chloride, concentrated sulfuric acid, hydrogen fluoride, etc. Since the resinous product from a dialkylbenzene is generally thermoplastic, it may be utilized to form molded articles in various pressed shape forms.

The present invention is further illustrated with reference to the following examples which concern the use of specific reactants and to particular methods of operation. In thus specifying a particular method of operation, comprising one of the specific embodiments of this invention, it is not intended thereby to limit the scope of the invention in strict accordance thereto.

*Example I*

A mixture of 20 grams (0.12 moles) of para-di-isopropylbenzene and 30 grams (0.20 moles) of di-tertiarybutyl peroxide was introduced into a rotating autoclave of 850 cc. capacity. Nitrogen was charged into the autoclave to a pressure of 50 atmospheres and the mixture in the autoclave heated to a temperature of approximately 140° C. as the contents of the reactor were stirred by rotating the autoclave. The reaction was allowed to continue for a period of about four hours. Following the above reaction period, the contents of the autoclave were emptied into a distillation flask and the mixture heated to distill off the tertiary butyl alcohol by-product. The residue consisted of a hard, brittle, amber-colored resin which could be drawn into a fine thread by means of a hot glass rod. 20 grams of product was obtained representing a substantially quantitative yield.

*Example II*

A mixture of 20 grams of di-ethylbenzene (0.15 mole) and 40 grams of di-tertiarybutyl peroxide (0.27 mole) was charged into a rotating autoclave and heated in the presence of 50 atmospheres of nitrogen to a temperature of approximately 140° C. for a period of four hours. The condensation reaction product was an extremely viscous, amber-colored, liquid soluble in petroleum solvents.

We claim as our invention:

1. A process for producing a resinous product from an alkyl aromatic hydrocarbon containing from 2 to 4 alkyl groups each having at least one hydrogen atom attached to the alpha-carbon atom, which comprises reacting said hydrocarbon with at least one molecular proportion of an organic peroxidic compound per molecular proportion of hydrocarbon at a temperature of from about the decomposition temperature of the peroxide to a temperature about 100° C. in excess of said decomposition temperature and at a pressure sufficient to maintain said reactants in substantially liquid phase.

2. The process of claim 1 further characterized in that the alkyl groups of said hydrocarbon contain from 1 to 4 carbon atoms.

3. The resinous product formed by the process of claim 1.

4. The resinous product formed by the process of claim 2.

5. The process of claim 1 further characterized in that said hydrocarbon is a benzenoid aromatic compound.

6. The process of claim 1 further characterized in that the organic peroxidic compound is formed in situ by oxidation of a portion of the hydrocarbon reactant with an oxygen-containing gas.

7. The process of claim 1 further characterized in that the reaction is effected in the presence of an inert liquid diluent.

8. A process for the production of a resinous condensation product which comprises reacting a poly-secondary-alkyl aromatic hydrocarbon with at least one molecular proportion of an organic peroxidic compound at condensation reaction conditions.

9. A process for the production of a resinous condensation product which comprises reacting a di-primary-alkylbenzene with at least one molecular proportion of an organic peroxidic compound at condensation reaction conditions.

10. A process for the production of a resinous condensation product which comprises reacting a di-secondary-alkylbenzene with at least one molecular proportion of an organic peroxidic compound at condensation reaction conditions.

11. A process for the production of a resinous condensation product which comprises reacting a mixture of di-primary-alkylbenzene and di-secondary-alkylbenzene with at least one molecular proportion of an organic peroxidic compound at condensation reaction conditions.

12. A process for the production of a resinous condensation product which comprises reacting di-isopropylbenzene with at least one molecular proportion of di-tertiary-butyl peroxide at condensation reaction conditions.

13. The resinous product formed by the process of claim 12.

RALPH B. THOMPSON.
LOUIS SCHMERLING.

REFERENCES CITED

The following references are of record in the file of this patent:

UNITED STATES PATENTS

| Number | Name | Date |
|---|---|---|
| 2,016,026 | Shinkle | Oct. 1, 1935 |
| 2,241,488 | Sparks et al. | May 13, 1941 |
| 2,414,028 | Dietrich et al. | Jan. 7, 1947 |

OTHER REFERENCES

Stephens, Jour. Am. Chem. Soc., vol. 48, pp. 1824–6, July 1926.

Gelissen et al., Ber. deu. Chem. Gesel., vol. 58, pp. 285–294 (1925).

Shinkle et al., Ind. Eng. Chem., vol. 28, pp. 275–280. March 1936.